(12) United States Patent
Van Hook

(10) Patent No.: US 6,357,435 B1
(45) Date of Patent: Mar. 19, 2002

(54) BARBEQUE LID ADJUSTMENT TOOL

(76) Inventor: Gregory O. Van Hook, 864 Volunteer Dr., Maryville, TN (US) 37801

( * ) Notice: Subject to any disclaimer, the term of this patent is extended or adjusted under 35 U.S.C. 154(b) by 0 days.

(21) Appl. No.: 09/767,758

(22) Filed: Jan. 23, 2001

(51) Int. Cl.[7] .................................................. A47J 36/00
(52) U.S. Cl. ................ 126/25 R; 126/41 R; 248/354.4; 248/354.6; 292/338
(58) Field of Search ............................. 126/25 R, 41 R, 126/25 A, 40, 50, 9 R, 25 AA, 30; 292/338, 288, 339; 248/354.6, 354.3, 354.4, 354.1, 351, 214, 215; D7/334, 402

(56) References Cited

U.S. PATENT DOCUMENTS

| | | |
|---|---|---|
| 1,249,073 A | 12/1917 | Halata |
| 1,415,522 A | 5/1922 | Cain |
| 1,482,086 A | 1/1924 | Mayworm |
| 1,629,012 A | 5/1927 | Trimble |
| 2,486,132 A | 10/1949 | Edvinsson |
| 2,520,578 A | 8/1950 | Treloar |
| 2,792,773 A | 5/1957 | Barker |
| 3,088,393 A | 5/1963 | Huckabee |
| 3,834,745 A | 9/1974 | Coates |
| 3,940,181 A | 2/1976 | Cheek, Jr. |
| 4,192,283 A | 3/1980 | Kridler et al. |
| 4,476,849 A | 10/1984 | Schmidt |
| 4,584,984 A | 4/1986 | Croft |
| 4,688,543 A | 8/1987 | Kopke |
| 4,759,338 A | 7/1988 | Croft |
| 4,895,130 A | 1/1990 | Staschke |
| 5,213,299 A | 5/1993 | Henry |
| 5,729,854 A | 3/1998 | Powers |
| D396,169 S | 7/1998 | Williamson |
| 5,829,426 A | 11/1998 | Cloutier |
| 6,176,232 B1 * | 1/2001 | Corcoran .................. 126/25 R |

\* cited by examiner

Primary Examiner—James C. Yeung
(74) Attorney, Agent, or Firm—Luedeka, Neely & Grahamn, P.C.

(57) ABSTRACT

The invention provides a barbeque lid adjustment device including a shaft member attached to a movable lid of a barbeque grill or cooker and a rotatable elongate member. The rotatable elongate member includes an engagement section at one end for engaging a cooking bin of the barbeque grill or cooker and a handle section at a distal end for rotating the elongate member about an axis coincident with the shaft member. The elongate member is rotatably attached to the shaft member between the engagement section and the handle section and enables a user to adjust a lid of a barbeque grill with one hand to various partially open positions for controlled cooking.

26 Claims, 5 Drawing Sheets

BARBEQUE LID ADJUSTMENT TOOL

FIELD OF THE INVENTION

This invention relates generally to devices for adjusting and maintaining the position of movable lids of barbecue grills or cookers so as to enhance the cooking operation.

BACKGROUND OF THE INVENTION

Barbecue grills or cookers often include a cooking bin and a corresponding movable lid. Generally, the lid is either hinged to the cooking bin or is a separate, removable piece. In either case, the lid is usually operable in only two positions, open and closed. In the case of a removable lid, the open position corresponds to the lid being separated completely from the cooking bin.

During a cooking operation, it is desirable to adjust and maintain a movable, hinged lid at various positions in order to control the heat and smoke during cooking of meats or other foods such as vegetables. Additionally, it may be advantageous to adjust and maintain the movable lid at various positions to compensate for conditions such as wind or ambient temperature. Since barbecue grills and cookers vary in size and design, it is desirable to provide a device which is adaptable for use with a variety of barbecue grills or cookers. Furthermore, it is desirable that the device be easily attached to a variety of barbecue grills or cookers with minimal installation skill and no substantial modification of the grill itself. It is also desirable that the device be adapted to provide for a disengaged position in which the device remains attached to the grill but allows the movable lid of the grill to close completely.

It is also desirable for the operator of the barbecue grill or cooker to have one hand free while adjusting the position of the movable, hinged lid. For instance, the operator may need to turn or rearrange the meat or other food with one hand while opening the lid with the other hand. In the case of a gas operated barbecue grill or cooker, the operator may desire to adjust the burner level while changing the position of the lid. Therefore, it is desirable to have a lid adjustment device which can be operated with one hand such that the hinged lid may be raised or lowered with one hand while the other hand remains free to complete other tasks. Furthermore, it is desirable that the device does not obstruct access to the interior of the grill.

Although devices for positioning the lid of a barbecue grill are known in the art, none of the devices are operable with one hand, easily installed, and adjustable to make them suitable for use with a wide variety of grills or cookers. There is a need therefore for a device which adjusts and maintains a movable, hinged lid or a barbecue grill or cooker in various positions. The device should be operable with one hand, require minimal installation with little or no modification of the grill, and be adjustable to accommodate use with a wide variety of grills of various sizes and designs.

SUMMARY OF THE INVENTION

With regard to the foregoing and other objects, the invention provides a barbecue lid adjustment device including a shaft member attached to a movable lid of a barbecue grill or cooker and a rotatable elongate member. The rotatable elongate member includes an engagement section at one end for engaging a cooking bin of the barbecue grill or cooker and a handle section at a distal end for rotating the elongate member about an axis coincident with the shaft member. The elongate member is rotatably attached to the shaft member between the engagement section and the handle section.

In another aspect, the invention provides a barbecue lid adjustment device comprising a shaft member attached to a movable lid of a barbecue grill or cooker and a rotatable assembly. The rotatable assembly includes an elongate pawl member for engaging a cooking bin of the barbecue grill or cooker, an elongate handle member for rotating the pawl member and the handle member about an axis coincident with the rod, and a locking mechanism for locking the pawl member and the handle member in adjustable angular relationship with respect to one another.

An advantage of the invention is that it provides a barbecue lid adjustment device operable with one hand. Another advantage of the invention is that it provides a barbecue lid adjustment device which adapts to use with a wide variety of barbecue grills or cookers with minimal installation. Furthermore, the barbecue lid adjustment device is removably adapted to the lids of barbecue grills or cookers or may be permanently installed on a barbecue grill or cooker.

BRIEF DESCRIPTION OF THE DRAWINGS

Further advantages of the invention will become apparent by reference to the detailed description when considered in conjunction with the figures, which are not to scale, wherein like reference numbers indicate like elements through the several views, and wherein.

DETAILED DESCRIPTION OF A PREFERRED EMBODIMENT

Figure 1:
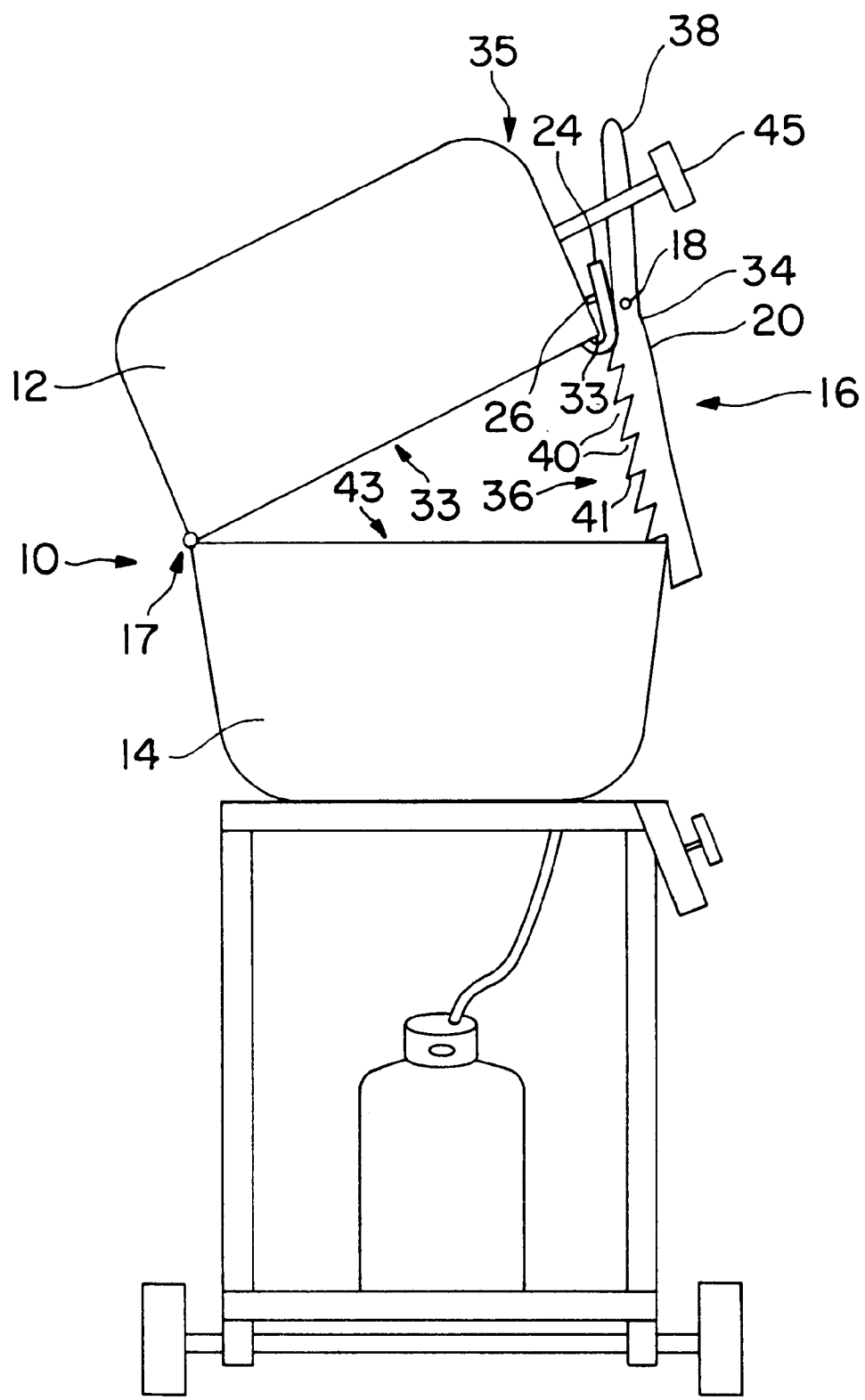
FIG. 1 is a side view of a barbecue grill or cooker with a lid supported by a barbecue lid adjustment device according to the invention.
Figure 2:
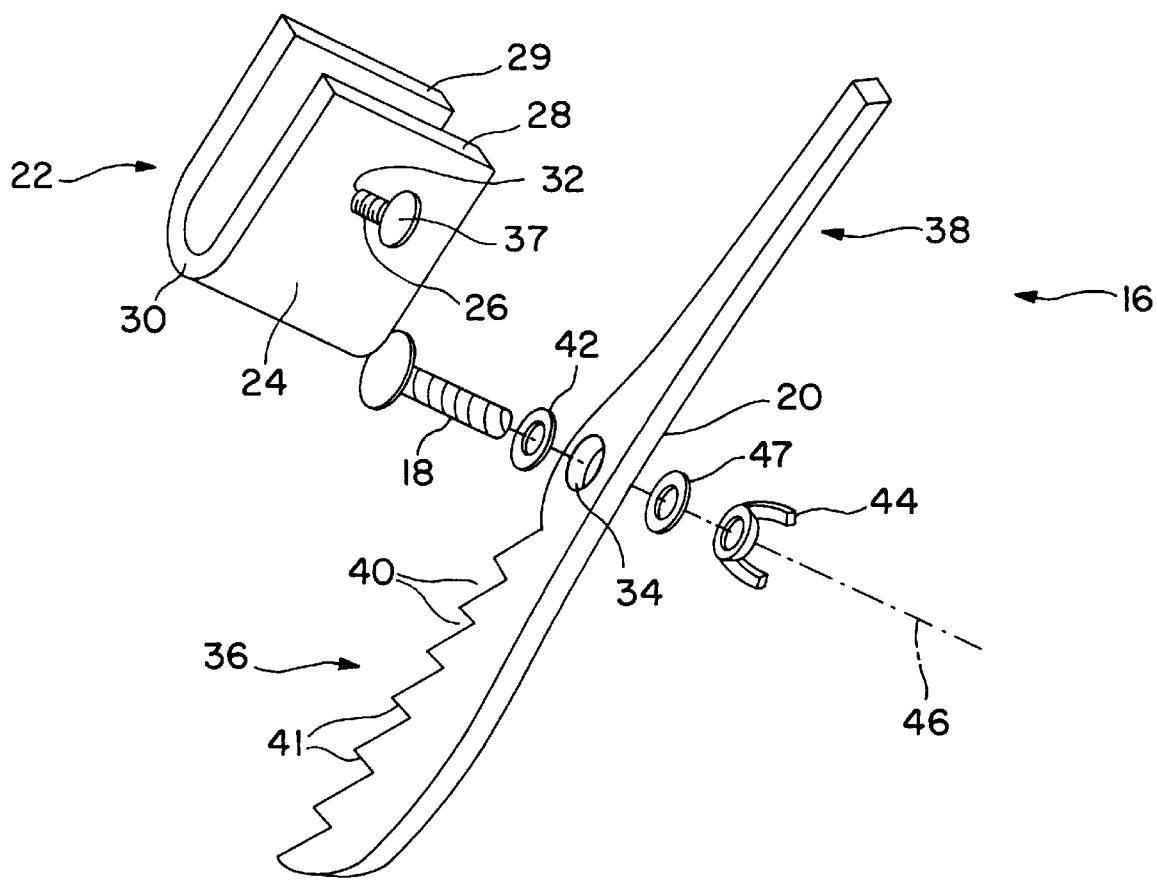
FIG. 2 is an exploded perspective view of the barbecue lid adjustment device according to the invention.

With reference to FIGS. 1 and 2, there is shown a barbecue grill or cooker 10 including a movable lid 12 and a cooking bin 14. The movable lid 12 is supported in a partially-opened position by a barbecue lid adjustment device 16. The lid 12 is pivotally connected to the cooking bin 14 by hinge 17. However, the barbecue lid adjustment device 16 may also be used with a removable lid for a cooking bin 14.

The barbecue lid adjustment device 16 includes a shaft member 18 attached to the movable lid 12 and an elongate member 20 rotatably mounted on the shaft member 18. In a preferred embodiment, the shaft member 18 is removably attached to the movable lid 12 by an attachment assembly 22 (FIG. 2); however, the shaft member 18 may also be permanently mounted to the movable lid 12 by any suitable method such as welding or may be cast or formed as a unit with the lid 12. In a preferred embodiment, the attachment assembly 22 comprises a substantially u-shaped member 24 and a threaded rod 26. The shaft member 18 is preferably permanently mounted to the attachment assembly 22 by welding or other suitable means known in the art. At least a portion of the shaft member 18 is preferably threaded and the shaft member 18 is preferably constructed of a metal such as steel, aluminum, brass, copper, and the like.

The substantially u-shaped member 24 has opposing side walls 28 and 29 connected by a connecting wall section 30 wherein at least one of the opposing side walls 28 has a threaded aperture 32 formed therein. The substantially u-shaped member 24 is adapted to fit over an edge 33 of the movable lid 12 such that one opposing side wall 28 is adjacent to the exterior of the movable lid 12 while the other opposing wall 29 is adjacent to the interior of the movable lid 12. The opposing side walls 28 and 29 are of sufficient spaced apart relation to allow the substantially u-shaped member 24 to fit over the edge 33 of a variety of barbecue grills or cookers 10 regardless of the wall thickness of the movable lid 12. The substantially u-shaped member 24 and the threaded rod 26 are preferably constructed of a metal such as steel, aluminum, brass, and the like.

In order to mount the attachment assembly 22 to the movable lid 12, the threaded rod 26 passes through the threaded aperture 32 to contact a wall surface 35 of the movable lid 12. Preferably, the threaded rod 26 comprises a thumb screw 37 which may be tightened by hand to ensure sufficient contact between the threaded rod 26 and the wall surface 35 of the movable lid 12 to fixedly mount the attachment assembly 22 to the movable lid 12. The threaded rod 26 is loosened or removed from the threaded aperture 32 in order to remove the attachment assembly 22 from the movable lid 12. By providing the threaded rod 26, the thumb screw 37, and the threaded aperture 32, the attachment assembly 22 may be repeatedly mounted and removed from a variety of barbecue grills or cookers 10 with no additional tools or implements.

A key feature of the invention is the elongate member 20 having an engagement section 36 and a handle section 38. The engagement section 36 has a series of indentations 40 having contact surfaces 41 for resting upon an edge 43 of the cooking bin 14. The handle section 38 preferably includes a portion covered by an insulating material such as wood or high temperature plastic. The elongate member 20 also has an aperture 34 formed therein between the engagement section 36 and the handle section 38. The elongate member 20 is rotatably mounted on the shaft member 18 by inserting the shaft member 18 through the aperture 34. The elongate member 20 is preferably formed of a metal such as steel, aluminum, or brass.

In a preferred embodiment, washers 42 and 47 are placed on the shaft member 18 on opposing sides of the elongate member 20. After the shaft member 18 has been inserted through the washer 42, the aperture 34 of the elongate member 20, and the washer 47, a wing nut 44 is placed onto the shaft member 18 to secure the washers 42 and 47 and the elongate member 20 thereto. The washers 42 and 47 and the wing nut 44 enable the elongate member 20 to rotate about an axis 46 coincident with the shaft member 18 during a lid adjustment procedure.

Figure 5:
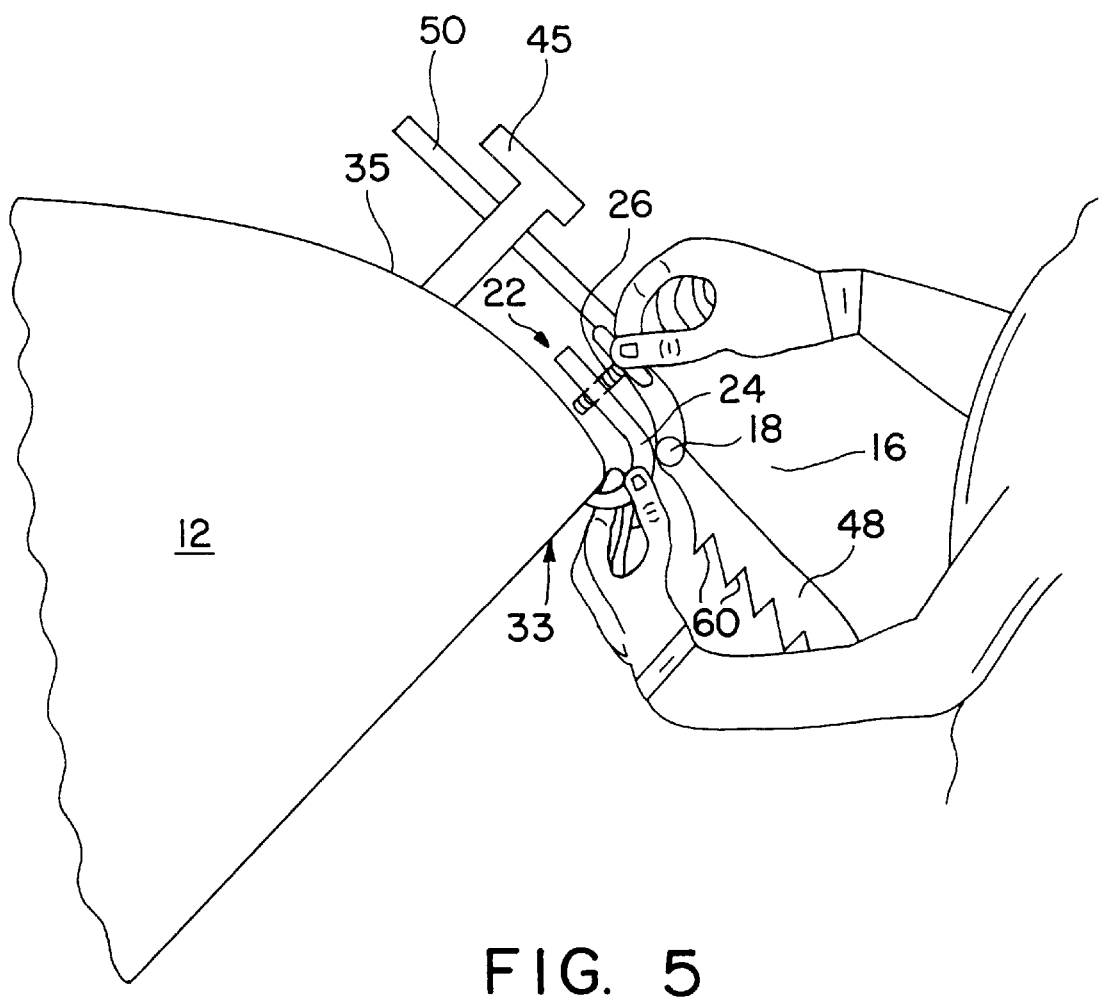
FIG. 5 is a side view of a user installing the barbecue lid adjustment device on the barbecue grill or cooker.

In operation, the barbecue lid adjustment device 16 is mounted on the movable lid 12 of the barbecue grill or cooker 10. As shown in FIG. 5, the substantially u-shaped member 24 is placed over an edge 33 of the movable lid 12. The threaded rod 26, preferably containing a thumb screw 37, is inserted into the threaded aperture 32 until an opposing end of the threaded rod 26 contacts the wall surface 35 of the movable lid 12 sufficiently to substantially immobilize the attachment assembly 22 with respect to movable lid 12. The present invention allows the barbecue lid adjustment device 16 to be used with a variety of barbecue grills or cookers 10 even if the grills or cookers 10 have a handle 45 across the front wall surface 35 of the movable lid 12. If the movable lid 12 has a handle 45, then the barbecue lid adjustment device 16 is adaptable to be placed between the movable lid 12 and the handle 45. The attachment assembly 22 may be adapted to mount in any location on the movable lid 12 in order to prevent the barbecue lid adjustment device 16 from obstructing access to the interior of the barbecue grill or cooker 10.

The washers 42 and 47, the elongate member 20, and the wing nut 44 are mounted on the shaft member 18 before or after the attachment assembly 22 is attached to the movable lid 12. After the attachment assembly 22 is fixedly mounted to the movable lid 12, the shaft member 18 is inserted through the washer 42, the aperture 34 in the elongate member 20, the washer 47, and the wing nut 44. Prior to the wing nut 44 being tightened on the shaft member 18, the elongate member 20 is rotated about the axis 46 in order to bring the engagement section 36 of elongate member 20 into proper orientation for engaging the edge 43 of the cooking bin 14. Once the proper orientation is achieved, the wing nut 44 is tightened on the shaft member 18 in order to secure the washers 42 and 47 and the elongate member 20 thereto. If the washers 42 and 47, the elongate member 20, and the wing nut 44 are mounted on the shaft member 18 prior to the attachment assembly 22 being attached to the movable lid 12, the orientation of the elongate member 20 can be adjusted by loosening the wing nut 44 and rotating the elongate member 20 about the axis 46 until the engagement section 36 is in proper orientation to engage the edge 43 of the cooking bin 14, then the wing nut 44 is tightened. The wing nut 44 can be tightened to a degree to enable rotation of the elongate member 20 about the shaft member 18 or to a degree sufficient to prevent substantial rotation of the elongate member 20 about the shaft member 18 once the desired lid adjustment is selected.

After the attachment assembly 22 is mounted to the movable lid 12, the elongate member 20 is rotatably mounted on the shaft member 18 and prior to completely tightening wing nut 44, the barbecue lid adjustment device 16 may be operated with one hand. The user can operate the barbecue lid adjustment device 16 by grasping the handle 45 of the lid 12 while using at least one finger to grasp the handle section 38 and raising or lowering the movable lid 12 with respect to the cooking bin 14. If necessary, the user can also rotate the elongate member 20 to adjust the position of the engagement section 36 to engage the edge 43 of the cooking bin 14 thus supporting the movable lid 12 in a variety of positions with respect to the cooking bin 14. The user can lift or lower the movable lid 12 with the handle 45 of the movable lid 12 and simultaneously rotate the elongate member 20 with the handle section 38. The user can also rotate the elongate member 20 to adjust the position of the engagement section 36 to disengage the edge 43 of the cooking bin 14 thereby closing the movable lid 12 completely. The one-handed operation allows the user to perform other tasks such as turning meat or food or adjusting a burner level of the barbecue grill or cooker 10 while repositioning the movable lid 12.

The barbecue lid adjustment device 16 is also adapted to allow the user to repeatedly return the movable lid 12 to the same position without adjusting or rotating the elongate member 20. Once the user has rotated the elongate member 20 to allow a contact surface 41 of an indentation 40 to engage the edge 43 of the cooking bin 14, the user can raise the lid 12 without rotating the elongate member 20. When the user lowers the lid 12, the elongate member 20 remains in the same position allowing the contact surface 41 of the indentation 40 to again engage the edge 43 of the cooking bin 14. The movable lid 12 is thus returned to the same position without adjusting the elongate member 20. A certain lid position may be particularly advantageous or suitable for cooking a particular food such as chicken. Once the user adjusts the elongate member 20 to maintain the movable lid 12 in the optimum position for cooking the desired food, the user can repeatedly raise the movable lid 12 to perform tasks such as turning or basting the food and then lower the lid 12 to the same position without rotating the elongate member 20.

Figure 3:
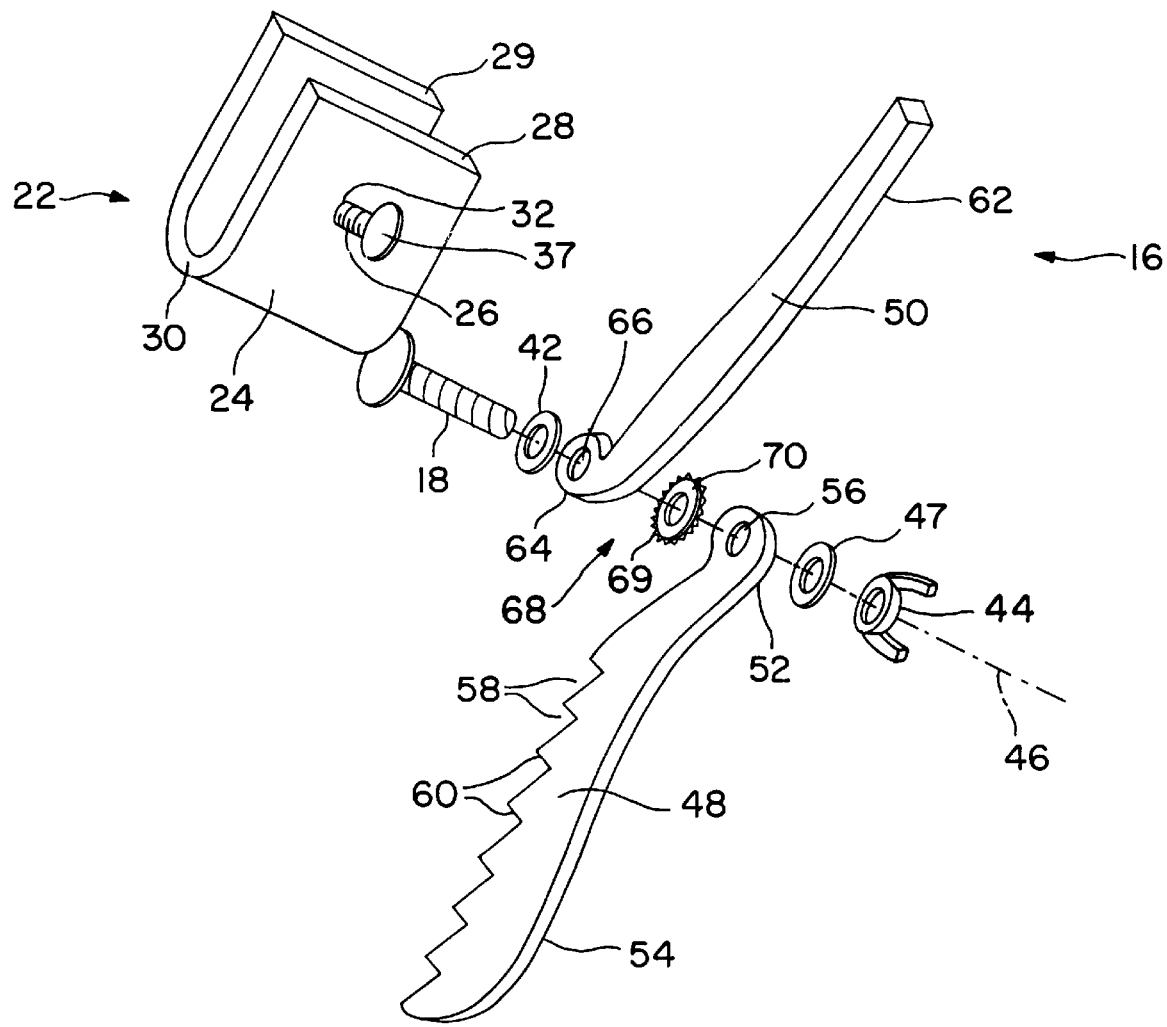
FIG. 3 is an exploded perspective view of another barbecue lid adjustment device according to the invention.
Figure 4:
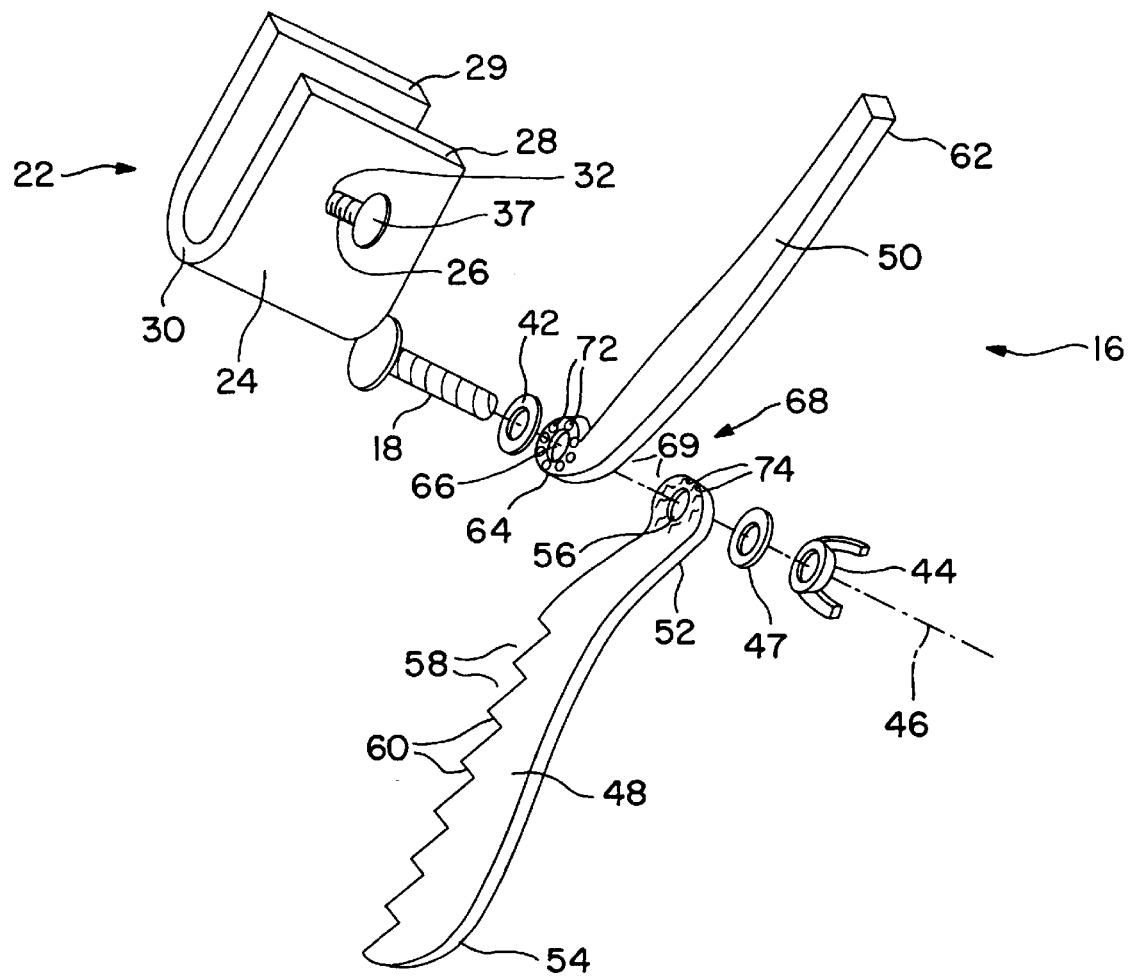
FIG. 4 is an exploded perspective view of another barbecue lid adjustment device.

In a preferred embodiment as shown in FIGS. 3 and 4, the elongate member 20 is provided by an elongate pawl member 48 and a separate elongate handle member 50. The shaft member 18 is either permanently attached to the movable lid 12 by welding or other suitable means known in the art or removably attached by means such as the attachment assembly 22 described above. The pawl member 48 and the handle member 50 are preferably constructed of a metal such as steel, aluminum, or brass.

The pawl member 48 has a first end 52 and a second end 54. The first end 52 has a first aperture 56 formed therein for rotatably mounting the pawl member 48 on the shaft member 18. The second end 54 of the pawl member 48 comprises a series of notches 58 having contact surfaces 60 for engaging an edge 43 of the cooking bin 14. The contact surfaces 60 rest upon an edge surface 43 of the cooking bin 14 and support the movable lid 12 in various positions with respect to the cooking bin 14.

The handle member 50 has a first end 62 and a second end 64. The second end 64 of handle member 50 has a second aperture 66 formed therein for rotatably mounting the handle member 50 on the shaft member 18. The first end 62 of the handle member 50 preferably includes an insulating material such as wood or high temperature plastic. The user may grasp the handle member 50, preferably on the portion including the insulating material, to operate the barbecue lid adjustment device 16.

In this embodiment the pawl member 48 and the handle member 50 may be locked in adjustable angular relationship to one another by a locking mechanism 68. Preferably, the locking mechanism 68 comprises the washers 42 and 47, the wing nut 44, and a frictional engagement device 69 disposed between the pawl member 48 and the handle member 50. In a preferred embodiment shown in FIG. 3, the frictional engagement device 69 comprises a star washer 70. One of the washers 42 is mounted on the shaft member 18 adjacent to the substantially unshaped member 24. Preferably, the handle member 50 is then rotatably mounted on the shaft member 18 by inserting the shaft member 18 through the second aperture 66 in the second end 64 of the handle member 50. The star washer 70 is mounted on the shaft member 18 after the handle member 50. Then the shaft member 18 is inserted through the first aperture 56 formed in the first end 52 of the pawl member 48 to rotatably mount the pawl member 48 on the shaft member 18. The other washer 47 is then placed on the shaft member 18 and the wing nut 44 is also mounted on the shaft member 18 to secure the washers 42 and 47, the star washer 70, the handle member 50, and the pawl member 48 thereto. The positions of the handle member 50 and the pawl member 48 can also be reversed such that the pawl member 48 is rotatably mounted on the shaft member 18 after the first washer 42.

The washers 42 and 47, the star washer 70, the handle member 50, the pawl member 48, and the wing nut 44 can be mounted on the shaft member 18 either before or after the attachment assembly 22 is fixedly attached to the movable lid 12. Once the attachment assembly 22 is fixedly mounted to the movable lid 12, the angular relationship between the pawl member 48 and the handle member 50 can be adjusted. The wing nut 44 is loosened or removed and the pawl member 48 is adjusted so that the contact surfaces 60 of the notches 58 formed in the second end 54 will engage an edge 43 of the cooking bin 14. The orientation of the handle member 50 can also be adjusted in order to facilitate operation of the barbecue lid adjustment device 16. If the movable lid 12 has a handle 45, it may be necessary to adjust the angular position of the handle member 50 so that the user can grasp the handle 45 of the movable lid 12 and the handle member 50 simultaneously. Once the pawl member 18 and the handle member 50 are in the proper angular relationship, the wing nut 44 is tightened. The star washer 70 thereby locks the pawl member 48 and the handle member 50 in the selected angular relationship while allowing the pawl member 48 and the handle member 50 to rotate as a unit about the axis 46 coincident with the shaft member 18. By locking the pawl member 48 and the handle member 50 in various angular relationships, the barbecue lid adjustment device 16 is operable with a wide variety of barbecue grills or cookers 10 regardless of the size or position of the handle 45 on the movable lid 12.

In another embodiment shown in FIG. 4, the frictional engagement device 69 comprises a series of embossed valleys 72 and peaks 74 formed on the pawl member 48 and the handle member 50. The valleys 72 are formed on the pawl member 48 circumferentially around the first aperture 56. The peaks 74 are formed on the handle member 50 around the circumference of the second aperture 66. The valleys 72 and the peaks 74 correspond substantially in size, shape, and number such that each valley 72 mates with each peak 74. The placement of the peaks 74 and valleys 72 could also be reversed with the peaks 74 formed on the pawl member 48 and the corresponding valleys 72 formed on the handle member 50.

In this embodiment, one of the washers 42 is mounted on the shaft member 18 adjacent to the substantially u-shaped member 24. The pawl member 48 and the handle member 50 are then rotatably mounted on the shaft member 18 by inserting the shaft member 18 through the first aperture 56 formed in the first end 52 of the pawl member 48 and the second aperture 66 in the second end 64 of the handle member 50. The pawl member 48 and the handle member 50 are placed on the shaft member 18 such that the valleys 72 and the peaks 74 are in the proper orientation to engage in a mating relationship with each other. The other washer 47 is then placed on the shaft member 18 and the wing nut 44 is also mounted on the shaft member 18 to secure the washers 42 and 47, the handle member 50, and the pawl member 48 thereto.

The washers 42 and 47, the pawl member 48, the handle member 50, and the wing nut 44 can be mounted on the shaft member 18 either before or after the attachment assembly 22 is fixedly attached to the movable lid 12. In this embodiment, once the attachment assembly 22 is fixedly mounted to the movable lid 12, the angular relationship between the pawl member 48 and the handle member 50 can be adjusted. The degree of angular adjustment is defined by the number of valleys 72 and peaks 74. As the number of valleys 72 and peaks 74 formed on the pawl member 48 and the handle member 50 is increased, smaller angular adjustments can be made. As described above, the wing nut 44 is loosened or removed and the pawl member 48 and the handle member 50 are adjusted to facilitate operation of the barbecue lid adjustment device 16. Once the pawl member 48 and the handle member 50 are in the proper angular relationship, the wing nut 44 is tightened. The valleys 72 mate with the peaks 74 thereby locking the pawl member 48 and the handle member 50 in the selected angular relationship while allowing the pawl member 48 and the handle member 50 to rotate as a unit about the axis 46 coincident with the shaft member 18. Other suitable means known in the art may be used for locking the pawl member 48 and the handle member 50 in selected angular relationship.

In the preferred embodiment comprising the pawl member 48 and the handle member 50, the barbecue lid adjustment device 16 is operable with one hand. The user grasps the handle member 50 and the handle 45 of the movable lid 12 if one is present on the barbecue grill or cooker 10, and lifts or lowers the movable lid 12. As the movable lid 12 is lifted or lowered, the user can rotate both the handle member 50 and the pawl member 48 by rotating the handle member 50 about the axis 46. Since the handle member 50 and the pawl member 48 are locked in a selected angular relationship by the locking mechanism 68, the pawl member 48 will rotate correspondingly about the axis 46. As the pawl member 48 is rotated, an edge 43 of the cooking bin 14 will engage one of the contact surfaces 60 of the notches 58. The contact surface 60 will rest on the edge 43 of the cooking bin 14 thereby supporting the movable lid 12 in a desired position. As the pawl member 48 is rotated and the movable lid 12 is lifted or lowered, the user can select the contact surface 60 that will engage the edge 43 of the cooking bin 14 thereby allowing the user to select and maintain a desired position of the movable lid 12. The pawl member 48 may also be rotated such that none of the contact surfaces 60 will engage the edge 43 of the cooking bin 14 thereby allowing the user to close the movable lid 12 completely. As the user is adjusting the position of the movable lid 12 by operating the barbecue lid adjustment device 16, the user has one hand free to perform other tasks such as turning or rearranging meat or other foods or adjusting the burner level of the barbecue grill or cooker 10.

In the preferred embodiment comprising the pawl member 48 and the handle member 50, the barbecue lid adjustment device 16 is also adapted to allow the user to repeatedly raise the movable lid 12 and return the lid 12 to the same position without adjusting the pawl member 48 or the handle member 50. Once the user has rotated the pawl member 48 and the handle member 50 to their proper orientations, the user can raise the lid 12 without rotating either the pawl member 48 or the handle member 50. The user can then lower the lid 12 while the pawl member 48 and the handle member 50 remain in the same orientation allowing the movable lid 12 to return to the same position without adjusting either the pawl member 48 or the handle member 50. The user can repeatedly lift the movable lid 12 to baste or turn the food and then lower the lid 12 to return it to the ideal cooking position for the food.

It is contemplated, and will be apparent to those skilled in the art from the foregoing specification, drawings, and examples, that modifications and or changes may be made in the embodiments of the invention. Accordingly it is expressly intended that the foregoing are only illustrative of the preferred embodiments and modes of operation, not limiting thereto, and that the true spirit and scope of the present invention be determined by reference to the appended claims.

What is claimed is:

1. A barbecue lid adjustment device comprising:
    a shaft member attached to a movable lid of a barbecue grill or cooker; and
    a rotatable elongate member having an engagement section at one end of said elongate member for engaging a cooking bin of said barbecue grill or cooker and a handle section at a distal end of said elongate member for rotating said elongate member about an axis coincident with said shaft member, said elongate member being rotatably attached to said shaft member between said engagement section and said handle section.

2. A barbecue lid adjustment device as in claim 1, wherein said shaft member is welded to said movable lid.

3. A barbecue lid adjustment device as in claim 1, wherein said shaft member is mounted on an attachment assembly comprising:
    a substantially u-shaped member for attachment to an edge of said movable lid of said barbecue grill or cooker, said u-shaped member having opposing side walls, said opposing side walls connected by a connecting wall section, at least one of said side walls having a threaded aperture formed therein; and
    a threaded rod for passing through said aperture and contacting said movable lid of said barbecue grill or cooker to secure said attachment assembly thereto.

4. A barbecue lid adjustment device as in claim 1, wherein said engagement section of said elongate member comprises a series of indentations, said indentations having a contact surface for resting upon an edge surface of said cooking bin of said barbecue grill or cooker.

5. A barbecue lid adjustment device as in claim 1, wherein said handle section of said elongate member comprises an insulating material.

6. A barbecue lid adjustment device as in claim 1, wherein at least a portion of said shaft member is threaded.

7. A barbecue lid adjustment device as in claim 1, wherein said elongate member has an aperture formed therein between said engagement section and said handle section, said aperture for mounting said elongate member to said shaft member.

8. A barbecue lid adjustment device as in claim 1, wherein a first washer, a second washer, and a nut are mounted on said shaft member, said first washer being mounted between said cooking bin and said elongate member, said second washer being mounted on said shaft member on an opposing side of said elongate member relative to said first washer, and said nut being mounted on said shaft member on an opposing side of said second washer relative to said elongate member.

9. A barbecue lid adjustment device as in claim 1, wherein said engagement section comprises an elongate pawl member and said handle section comprises an elongate handle member, said pawl member and said handle member being separately rotatably attached to said shaft member for rotation about said axis coincident with said shaft member.

10. A barbecue lid adjustment device as in claim 9, wherein said pawl member has a first end and a second end, said first end having a first aperture formed therein for rotatably mounting said pawl member to said shaft member, and said second end having a series of notches formed therein, said notches having a contact surface for resting upon an edge surface of said cooking bin of said barbecue grill or cooker.

11. A barbecue lid adjustment device as in claim 9, wherein said handle member has a first end and a second end, said second end having a second aperture formed therein, said second aperture for rotatably mounting said handle member to said shaft member.

12. A barbecue lid adjustment device as in claim 9, wherein said pawl member and said handle member are locked in adjustable angular relationship by a locking mechanism, the locking mechanism comprising a frictional engagement device disposed between said pawl member and said handle member adjacent to said shaft, a first washer mounted on said shaft member on an opposing side of said pawl member from said frictional engagement device, a second washer mounted on said shaft member on an opposing side of said handle member from said frictional engagement device, and a nut mounted on said shaft member for engaging a threaded portion of said shaft member to secure said washers, said pawl member, and said handle member to said shaft member.

13. A barbecue lid adjustment device as in claim 12, wherein said frictional engagement device comprises a star washer.

14. A barbecue lid adjustment device as in claim 12, wherein said frictional engagement device comprises a series of embossed peaks formed on said pawl member and a corresponding series of mating valleys formed on said handle member.

15. A barbecue lid adjustment device as in claim 12, wherein said frictional engagement device comprises a series of embossed peaks formed on said handle member and a corresponding series of mating valleys formed on said pawl member.

16. A barbecue lid adjustment device comprising:
   a shaft member attached to a movable lid of a barbecue grill or cooker; and
   a rotatable assembly comprising an elongate pawl member for engaging a cooking bin of said barbecue grill or cooker, said elongate pawl member rotatably attached to said shaft member, an elongate handle member for rotating said pawl member and said handle member about an axis coincident with said shaft member, said handle member separately rotatably mounted on said shaft member, and a locking mechanism for locking said pawl member and said handle member in adjustable angular relationship with respect to one another.

17. A barbecue lid adjustment device as in claim 16, wherein said shaft member is welded to said movable lid.

18. A barbecue lid adjustment device as in claim 16, wherein said shaft member is mounted on an attachment assembly comprising:
   a substantially u-shaped member for attachment to an edge of said movable lid of said barbecue grill or cooker, said u-shaped member having opposing side walls, said opposing side walls connected by a connecting wall section, at least one of said side walls having a threaded aperture formed therein; and
   a threaded rod member for passing through said aperture and contacting said movable lid of said barbecue grill or cooker to secure said attachment assembly thereto.

19. A barbecue lid adjustment device as in claim 16, wherein said pawl member has a first end and a second end, said first end having a first aperture formed therein for rotatably mounting said pawl member to said shaft member, and said second end having a series of notches formed therein, said notches having a contact surface for resting upon an edge surface of said cooking bin of said barbecue grill or cooker.

20. A barbecue lid adjustment device as in claim 16, wherein said elongate handle member comprises an insulating material.

21. A barbecue lid adjustment device as in claim 16, wherein said handle member has a first end and a second end, said second end having a second aperture formed therein, said aperture for rotatably mounting said handle member to said shaft member.

22. A barbecue lid adjustment device as in claim 16, wherein at least a portion of said shaft member is threaded.

23. A barbecue lid adjustment device as in claim 16, wherein said locking mechanism comprises:
   a frictional engagement device disposed between said pawl member and said handle member adjacent to said shaft;
   a first washer mounted on said shaft member on an opposing side of said pawl member from said frictional engagement device;
   a second washer mounted on said shaft member on an opposing side of said handle member from said frictional engagement device; and
   a nut mounted on said shaft member for engaging a threaded portion of said shaft member to secure said washers, said pawl member, said frictional engagement device, and said handle member to said shaft member.

24. A barbecue lid adjustment device as in claim 23, wherein said frictional engagement device comprises a star washer.

25. A barbecue lid adjustment device as in claim 23, wherein said frictional engagement device comprises a series of embossed peaks formed on said engagement member and a corresponding series of mating valleys formed on said handle member.

26. A barbecue lid adjustment device as in claim 23, wherein said frictional engagement device comprises a series of embossed peaks formed on said handle member and a corresponding series of mating valleys formed on said engagement member.

* * * * *